Patented July 10, 1928.

1,676,543

UNITED STATES PATENT OFFICE.

ALPHONSE GAMS AND GUSTAVE WIDMER, OF BASEL, SWITZERLAND, ASSIGNORS TO THE FIRM: SOCIETY OF CHEMICAL INDUSTRY IN BASLE, OF BASEL, SWITZERLAND.

CONDENSATION PRODUCT OF UREA AND FORMALDEHYDE AND PROCESS OF MAKING SAME.

No Drawing. Application filed May 20, 1926, Serial No. 110,529, and in Switzerland June 5, 1925.

Our invention relates to the manufacture of clear condensation products of urea and formaldehyde. It comprises the process of manufacture thereof and the new products themselves as well as the application of the same in the industry of artificial materials.

In order to obtain a clear condensation product from formaldehyde and urea it has hitherto been necessary to use an excess of formaldehyde in the condensation. When the molecular proportion of formaldehyde to urea falls below 3:1 turbid opaque masses are obtained. For instance when a mixture of two molecular proportions of commercial formaldehyde and one molecular proportion of urea is boiled a thick precipitation is produced.

In order to obtain a clear condensation product from a molecular ratio of less than 3 molecules of formaldehyde to 1 molecule of urea, it has hitherto been necessary to conduct the reaction with addition of a basic substance.

According to this invention clear condensation products of formaldehyde and urea are made with use of a minimum proportion of formaldehyde, for instance a molecular proportion of 2 of formaldehyde to 1 of urea, by conducting the condensation in presence of active carbon, with or without the use of a substance that delays the reaction, such as an alcohol, a ketone, an ester or a mixture of any of these.

It is a matter of indifference whether the suspended carbon is present during the whole course of the condensation or eliminated by filtration in the beginning or in any desired stage of the reaction. The condensation products obtained are as clear as water and have a notable stability as compared with that of the products obtained by the processes hitherto usual.

According to the conditions of the reaction, such as the temperature or duration thereof, various well-characterized condensation stages can be attained by the invention.

When formaldehyde and urea are shaken together at the ordinary temperature there is formed dimethylol-urea, which can be obtained in pure form after separation of the carbon by simple evaporation of the water.

This is surprising because hitherto dimethylol-urea has only been accessible in pure form by the process of Einhorn and Hamburger (B. 41, S. 24, Ann. 361, S. 132 and 139, and Ann. 373, S. 207), namely the basic condensation of formaldehyde and urea with barium hydroxide and the passage of carbon dioxide after the reaction is complete for the purpose of separating the base.

If the said mixture is heated for some hours in a reflux apparatus and then evaporated in a vacuum, there is obtained a syrup resembling honey and as clear as water, which is easily soluble in water and alcohol and may be regarded as the first stage of condensation.

If the heating is prolonged there may be isolated a highly viscous product, which is indeed still soluble in water but is insoluble in alcohol and may be regarded as the second stage of condensation.

On continuing the heating still further, there is finally obtained a highly viscous product, which is soluble neither in water nor alcohol and constitutes the third stage of condensation.

If the more or less viscous syrups which are produced by evaporation of the corresponding condensation solution are maintained for a further time at a moderate temperature, such as 60–100° C., gelatinization and solidification set in and there are formed first gummy masses which become hard, clear and solid as the treatment is prolonged and are valuable as artificial materials.

The reaction can be retarded as may be desired by the addition of an alcohol, a ketone, an ether, an ester or a mixture of any of these. Such an agent for the purpose of retarding the reaction may be added at any phase of the condensation.

The use of a retarding agent is particularly advisable when the condensation product of a lower stage is being converted into one of a higher stage in the presence of an acid or a substance which yields an acid. In such a case the retarding agent prevents the end point of the condensation of polymerization from being attained too rapidly.

The products obtained by the invention are applicable to very various technical purposes according to the stage of condensation. For example, they are useful as lacquers, varnishes, plastic masses, substitutes of horn or the like. They may be incorporated with dyestuffs, filling materials, agents imparting elasticity or the like with regard to the purpose for which they are to be used.

In the term "urea" also derivatives and substitutions products of urea and in the term "formaldehyde" also polymerides of the latter shall be included.

The following examples illustrate the invention, the parts being by weight:—

*Example 1.*

60 parts of urea are dissolved in 165 parts of commercial formaldehyde of 36 per cent strength; the solution is shaken with 5 parts of animal charcoal and then filtered. The solution is now evaporated to dryness at a low temperature in a vacuum. The residue consists of pure dimethylol-urea.

*Example 2.*

60 parts of urea are dissolved in 165 parts of commercial formaldehyde of 36 per cent strength, and the solution is filtered with about 5 parts of animal charcoal. The solution is then boiled for some hours in a reflux apparatus and subsequently evaporated at a low temperature in a vacuum. The product is a syrup, clear as glass, soluble in water and alcohol (first stage of condensation).

*Example 3.*

60 parts of urea are dissolved in 165 parts of commercial formaldehyde of 36 per cent strength and about 5 parts of animal charcoal are added to the solution. The latter is then boiled for a long time in a reflux apparatus in an air-bath and the charcoal is then filtered. The condensation product obtained is soluble in water and is precipitated therefrom by alcohol (second stage of condensation). It can be worked up in known manner into solid or gelatinous polymerization products.

*Example 4.*

60 parts of urea are dissolved in 165 parts of commercial formaldehyde of 36 per cent strength. The solution is filtered with 5–10 parts of animal charcoal and then heated under pressure for some hours. An oily mass, clear as crystal is obtained, which is capable of being precipitated by alcohol and water (third stage of condensation). This product can be worked up in known manner to solid polymerization products.

*Example 5.*

240 parts of urea are dissolved in 660 parts of commercial formaldehyde of 36 per cent strength and about 200 parts of ethyl alcohol are added. The solution is filtered with animal charcoal and boiled for a short time on the water-bath in a reflux apparatus. To the clear solution 0.24 part of concentrated phosphoric acid in 20 parts of water are added while it is hot, and boiling is continued for some hours. The solution is now capable of being precipitated by alcohol and is miscible with water. It is evaporated in a vacuum when it becomes a thick syrup, which is hardened at a moderate temperature.

If the alcohol is omitted while retaining the rest of the conditions the same, the condensation proceeds very rapidly and the stage at which the product can be precipitated by alcohol is attained in a shorter time.

The phosphoric acid can be added in the cold to the solution which has been boiled for a short time, and then the water can be distilled at a low temperature in a vacuum and the substance which retards condensation then added.

Instead of ethyl alcohol another alcohol, or a ketone, an ether, or an ester, or a mixture of any of these may be used.

What we claim is:

1. A process for the manufacture of condensation products from urea and formaldehyde, wherein the condensation is conducted in presence of active carbon, the latter being afterwards eliminated in any desired stage of the condensation.

2. A process for the manufacture of clear condensation products from urea and formaldehyde by using a minimum proportion of formaldehyde, wherein the condensation is conducted in presence of active carbon, the latter being afterwards eliminated in any desired stage of the condensation.

3. A process as referred to in claim 1, wherein an organic compound retarding the reaction is added.

4. A process as referred to in claim 2, wherein an organic compound retarding the reaction is added.

5. A process as referred to in claim 1, wherein the initial condensation products obtained are transformed into products of higher condensation stages by heating.

6. A process as referred to in claim 2, wherein the initial condensation products obtained are transformed into products of higher condensation stages by heating.

7. A process as referred to in claim 1, wherein the initial condensation products obtained are transformed into products of higher condensation stages by heating in presence of a substance having acid reaction.

8. A process as referred to in claim 2, wherein the initial condensation products obtained are transformed into products of higher condensation stages by heating in presence of a substance having acid reaction.

9. A process as referred to in claim 1, wherein the initial condensation products obtained are transformed into products of higher condensation stages by heating in presence of a substance having acid reaction and of an organic compound retarding the reaction.

10. A process as referred to in claim 2, wherein the initial condensation products obtained are transformed into products of higher condensation stages by heating in presence of a substance having acid reaction and of an organic compound retarding the reaction.

11. A process as referred to in claim 1, wherein the condensation products obtained are hardened by heating.

12. A process as referred to in claim 2, wherein the condensation products obtained are hardened by heating.

13. A process as referred to in claim 1, wherein the condensation products are mixed with filling materials, dyestuffs, agents imparting elasticity and hardened by heating.

14. A process as referred to in claim 2, wherein the condensation products are mixed with filling materials, dyestuffs, agents imparting elasticity and hardened by heating.

15. A process for the manufacture of clear condensation products from urea and formaldehyde by using not more than two molecular proportions of formaldehyde to one molecular proportion of urea, wherein the condensation is conducted in presence of active carbon, this latter being afterwards eliminated in any desired stage of the condensation and wherein the initial condensation products obtained are transformed into products of higher condensation stages by heating in presence of phosphuric acid and ethyl alcohol and hardened by heating.

16. A process as referred to in claim 15 wherein the condensation products obtained are mixed with filling materials, dyestuffs, agents imparting elasticity and hardened by heating.

17. As articles of manufacture the products obtained by reacting with formaldehyde on urea in the molecular proportion of not more than 2:1 in presence of active carbon and in the absence of catalysts, which products constitute clear viscous bodies useful as lacquers, varnishes, impregnating materials and the like and which by hardening yield clear, solid and hard masses of high stability towards chemical and physical influences and useful as artificial materials, for instance as plastic masses, substitutes of horn and the like.

18. As articles of manufacture the products obtained by reacting with formaldehyde on urea in the molecular proportion of not more than 2:1 in presence of active carbon and in absence of catalysts and hardened by heating, which products constitute clear, solid, hard masses of the specific gravity 1.4 and of high stability towards chemical and physical influences and useful as artificial materials, for instance plastic masses, substitute for horn and the like.

In witness whereof we have hereunto signed our names this 10th day of May, 1926.

ALPHONSE GAMS.
GUSTAVE WIDMER.